Sept. 25, 1951 F. C. ALBRIGHT 2,568,696
AIRCRAFT LANDING GEAR HAVING SHOCK ABSORBER INSIDE HUB
Filed Nov. 17, 1949 4 Sheets-Sheet 1

INVENTOR.
FRANKLIN C. ALBRIGHT
BY
*T. J. Plante*
ATTORNEY

Sept. 25, 1951 F. C. ALBRIGHT 2,568,696
AIRCRAFT LANDING GEAR HAVING SHOCK ABSORBER INSIDE HUB
Filed Nov. 17, 1949 4 Sheets-Sheet 2

INVENTOR.
FRANLIN C. ALBRIGHT
BY
ATTORNEY

Sept. 25, 1951      F. C. ALBRIGHT      2,568,696
AIRCRAFT LANDING GEAR HAVING SHOCK ABSORBER INSIDE HUB Filed Nov. 17, 1949      4 Sheets-Sheet 3

INVENTOR.
FRANKLIN C. ALBRIGHT
BY
T. J. Plante
ATTORNEY

Sept. 25, 1951          F. C. ALBRIGHT          2,568,696
AIRCRAFT LANDING GEAR HAVING SHOCK ABSORBER INSIDE HUB
Filed Nov. 17, 1949          4 Sheets-Sheet 4
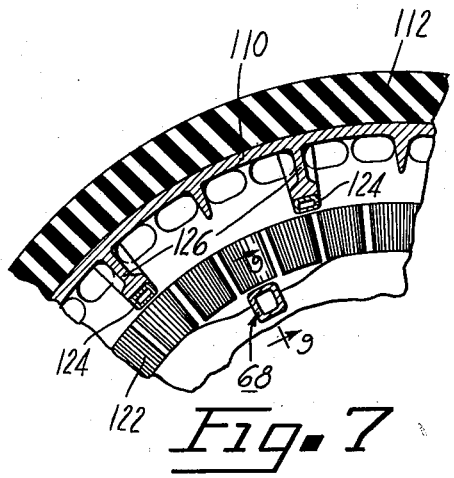
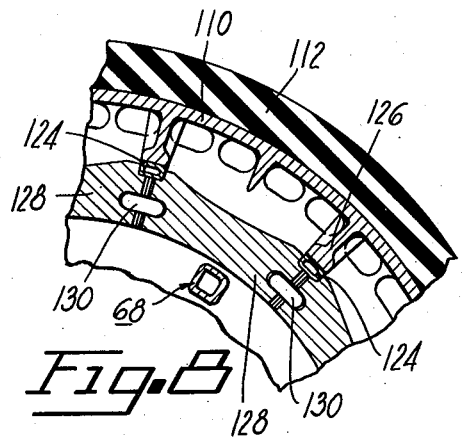
Fig. 7          Fig. 8
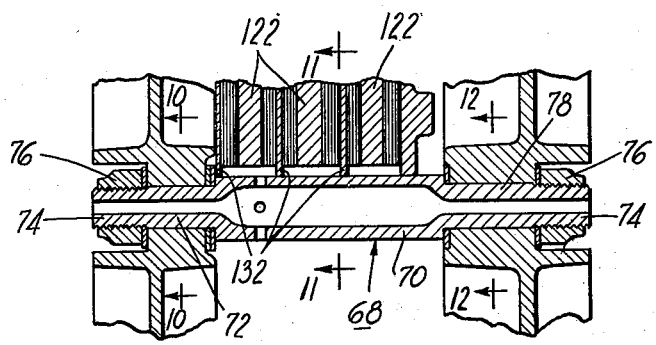
Fig. 9
    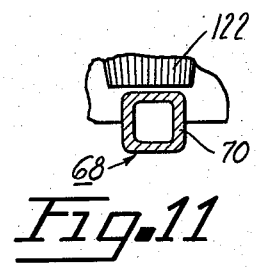    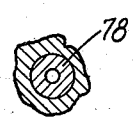
Fig. 10      Fig. 11      Fig. 12
INVENTOR.
FRANKLIN C. ALBRIGHT
BY
T. J. Plante
ATTORNEY Patented Sept. 25, 1951

2,568,696

UNITED STATES PATENT OFFICE 2,568,696

AIRCRAFT LANDING GEAR HAVING SHOCK ABSORBER INSIDE HUB

Franklin C. Albright, South Bend, Ind., assignor to Bendix Aviation Corporation, South Bend, Ind., a corporation of Delaware Application November 17, 1949, Serial No. 127,937

19 Claims. (Cl. 244—111)

This invention is in the field of aircraft landing gear, an aircraft component which comprises a ground-engaging element (such as a wheel), a shock absorber, and, in some instances, a brake associated with the ground-engaging element.

In my improved landing gear, the entire working structure of the energy-dissipating mechanism, including both the shock absorber and the structural means for causing telescoping movement of the shock absorber parts, is located entirely within the confines of the wheel assembly. This arrangement provides a very compact installation, which permits both weight reduction and cost reduction in the landing gear, with an improvement in structural rigidity and in shock absorbing efficiency.

Other attributes and advantages of my improved landing gear will become apparent during the following description of an illustrative embodiment, reference being had in the course of the description to the accompanying drawings, in which.

Figure 6:
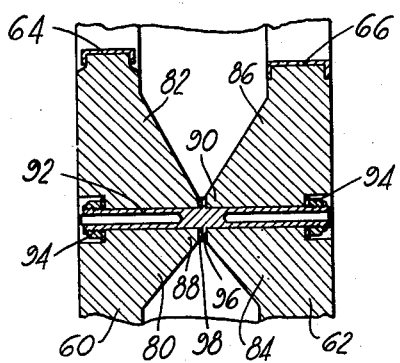
Figure 3:
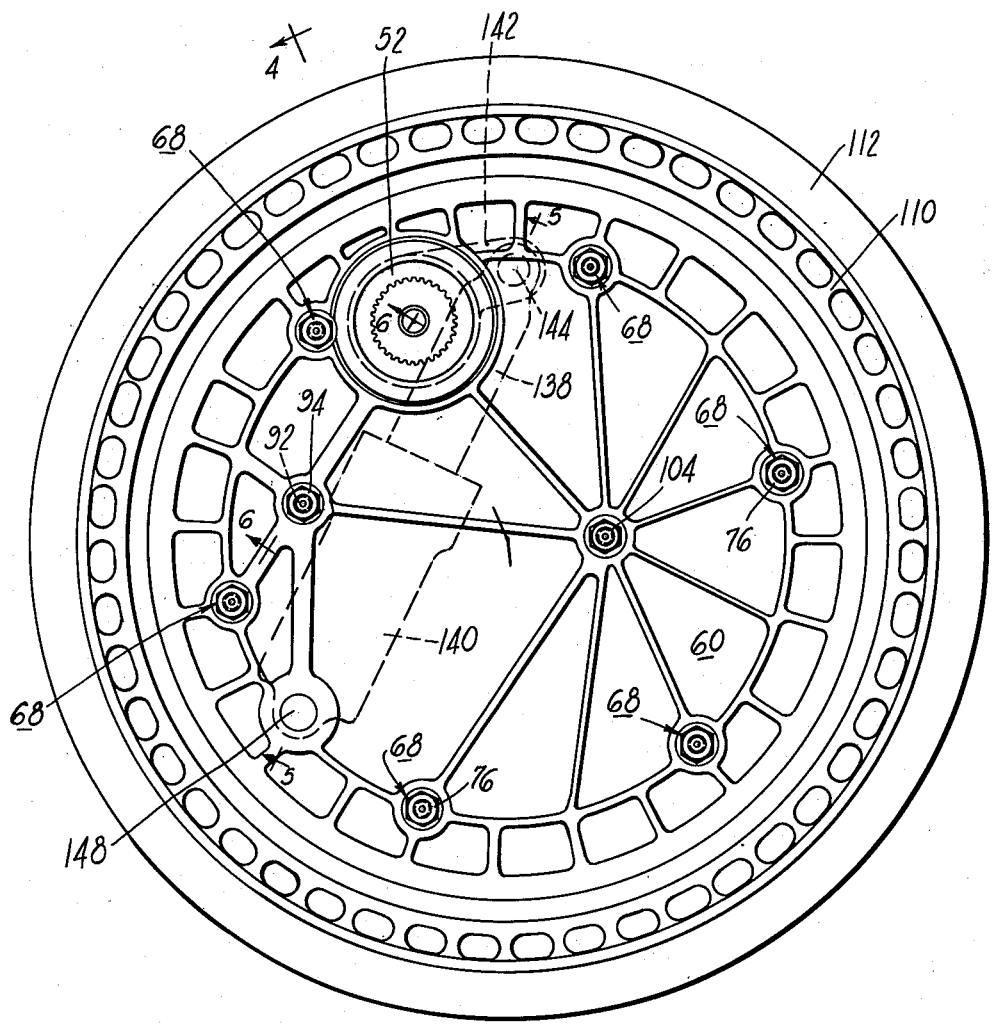
Figure 3 is a side elevation of a specific working embodiment of the invention.
Figure 4:
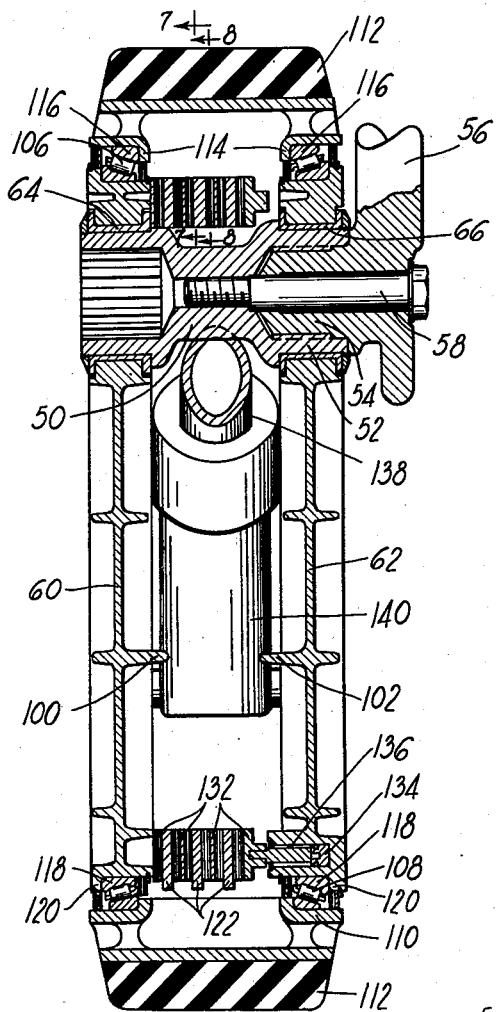
Figure 5:
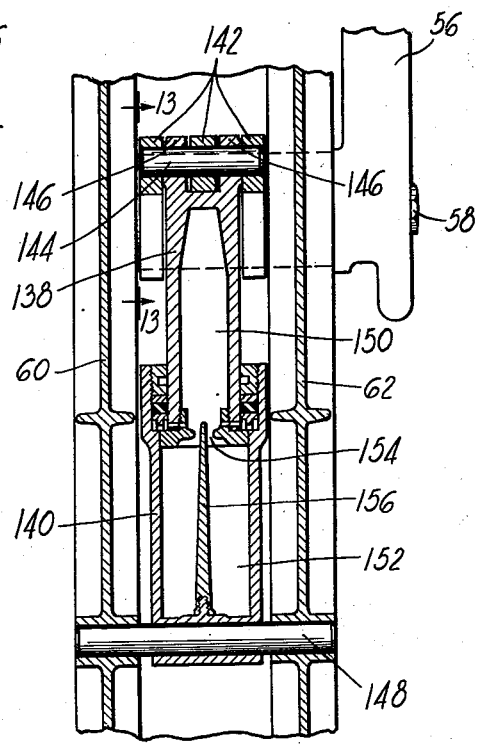
Figure 13:
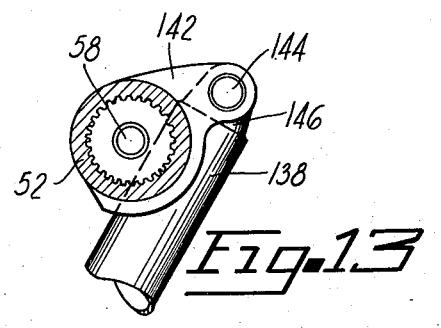

Figures 4, 5, and 6 are sectional views taken on the lines 4—4, 5—5, and 6—6, respectively, of Figure 3;

Figures 7 and 8 are partial sectional views taken on the lines 7—7 and 8—8, respectively, of Figure 4;

Figure 9 is an enlarged sectional view taken on the line 9—9 of Figure 7;

Figures 10, 11, and 12 are sectional views taken on the lines 10—10, 11—11, and 12—12, respectively, of Figure 9; and Figure 13 is a sectional view taken on the line 13—13 of Figure 5.

Figure 1:
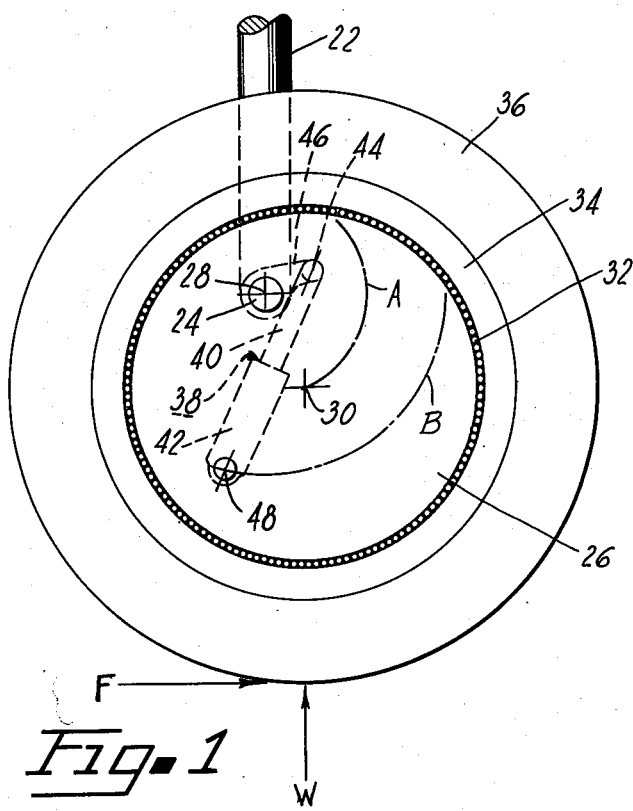
Figure 1 is a side elevation showing the general outline of the ground-engaging portion of an aircraft landing gear which incorporates my invention.
Figure 2:
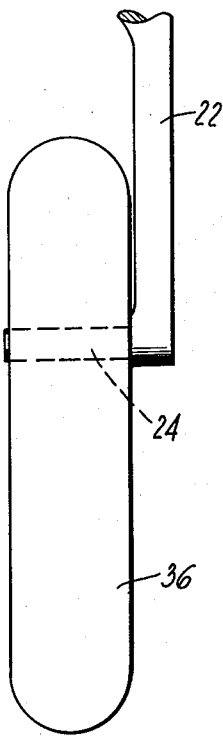
Figure 2 is a rear elevation of the structure shown in Figure 1.

A general illustration of my improved landing gear assembly is provided in Figures 1 and 2. A strut 22, which extends downwardly from the body of the aircraft, has at its lower end a laterally-extending non-rotatable axle 24. A large-diameter wheel-supporting hub 26 is pivotally mounted on axle 24, the pivotal center 28 of the hub on the axle being above and ahead of the axis 30 of the hub. Two axially-spaced large-diameter bearings 32 are supported on the periphery of the hub, and a wheel 34, carrying a tire 36, is rotatably mounted on the bearings.

A shock absorber 38, comprising two telescopically associated members 40 and 42, is mounted inside hub 26. Shock absorber member 40 is pivotally connected at 44 to an arm 46 which is non-rotatably secured to axle 24, and which extends upwardly and rearwardly therefrom. Shock absorber member 42 is pivotally connected at 48 to hub 26.

The internal shock absorber 38 absorbs or dissipates the energy produced by either a vertical or aft force or any combination of these forces when applied to the tire 36. Since forward movement of the aircraft corresponds to movement toward the left in Figure 1, the wheel is a "trailing," or "swingback," wheel. Either an aft force F or a vertical force W will cause the axis, or center, 30 of hub 26 to move in the arc A about center point 28. During this movement of the hub, pivot point 44 at one end of the shock absorber remains stationary, and pivot point 48 at the other end of the shock absorber moves with the hub in the arc B, thus shortening the shock absorber from its original length to the length represented by the distance between pivot point 44 and the point on arc B reached by pivot point 48 during its stroke, the amount of angular movement of the hub depending upon the severity of the force acting on the tire.

The shock absorber 38 is mounted entirely within the confines of hub 26; and an arm 46, which provides the only connection between the shock absorber and the vertical strut 22, is also located inside the hub. Use of the internal shock absorber eliminates the need for a conventional external shock absorber in strut 22, and provides a simple, compact landing gear unit, which weighs less and costs less to manufacture than a conventional landing gear. Furthermore, the bending loads absorbed by the strut 22 have no effect on the internal shock absorber, and its shock absorbing efficiency is therefore not diminished by any "sticking" tendency due to friction induced by bending loads.

In locating the three pivot points—28, 44, and 48—certain basic factors must be considered. Pivot point 28 must, of course, be ahead of the axis 30 of the hub. Furthermore, it should be relatively high in the assembly, i. e. near the top of the hub, in order to provide minimum angular travel of the hub during a given amount of vertical travel of the hub. Minimum angular travel is desirable in order to keep the longitudinal axis of the shock absorber as far as possible from dead center position at both ends of its stroke. At the same time, it is desirable to obtain maximum vertical movement of the hub and maximum telescoping movement of the shock absorber, in order to derive the best energy absorption and dissipation from the shock absorber.

The pivot point 44 should also be near the top of the hub, in order to obtain full telescoping travel of the shock absorber well in advance of dead center position (the position in which the longitudinal axis of the shock absorber would pass through point 28). As the shock absorber approaches dead center position at either end its shock absorbing capacity is reduced, owing to the relatively high ratio of angular travel to telescoping travel. The desired length of arm 46 is controlled by two opposing factors. On the one hand, a relatively long arm is desirable because it provides a greater lever arm for the shock absorber resistance in opposing movement of the hub. On the other hand, the arm must be short enough to accommodate the length of the telescoped shock absorber between point 44 and the point on arc B reached by pivot point 48 at the end of its stroke.

Pivot point 48 should be so located as to: (1) permit the necessary angular travel of the shock absorber, (2) provide a shock absorber having maximum telescoping travel within the available space, and (3) avoid locating the shock absorber too closely to dead center in its extended position.

Figures 3 to 13, inclusive, disclose, in detail, a specific working embodiment of the invention. In this embodiment, the axle has an internally threaded center portion 50, and an enlarged end portion 52 which is sleeved on, and splined to, a boss 54 formed as an integral part of strut 56. The axle is secured to the strut by means of a bolt 58 which is screwed into the center portion 50 of the axle. Preferably both ends of the axle are internally splined in order to make each axle suitable for either the left or right strut.

The wheel-supporting hub consists of two large-diameter co-axial wheel-supporting members 60 and 62. The wheel-supporting members are pivoted on bearings 64 and 66, which encircle the end portions 52 of the axle. Owing to the fact that both a brake assembly and a shock absorber are mounted between the wheel-supporting members, it is necessary for these members to be spaced apart axially throughout most of their vertical area. A plurality of angularly-spaced axially-extending tie members 68 (one of which is shown in detail in Figures 9 to 12) have center portions which serve as spacers between the two wheel-supporting members, and end portions by means of which the wheel-supporting members are secured against movement away from one another.

Each tie member 68 has an enlarged square center portion 70 (see Figures 9 and 11) which spaces the inner surfaces of the wheel-supporting members, a smaller square portion 72 (see Figures 9 and 10) extending through at least one of the wheel-supporting members to prevent rotation of the tie member, and rounded, externally-threaded end portions 74, which are engaged by nuts 76 to hold the wheel-supporting members against spreading movement. The portion 78, shown in Figure 12, is preferably of round cross-section, because only one portion such as 72 is required, and the round portion is less expensive to manufacture. The entire tie member is hollow, in order to minimize the weight of the assembly.

In order to strengthen the hub (constituted by wheel-supporting members 60 and 62) against lateral bending forces caused by side loads exerted on the wheel, two trusses are provided, each consisting of aligned internal ribs formed on the two wheel-supporting members and an axially-extending fastening member which extends through the ribs intermediate their ends. One of the trusses is shown in section in Figure 6. Ribs 80 and 82 formed on wheel-supporting member 60 are aligned with ribs 84 and 86, respectively, formed on wheel-supporting member 62. Ribs 80 and 82 are integral with a boss 88 on member 60, and ribs 84 and 86 are integral with a boss 90 on member 62. An axially-extending fastening member 92 extends through bosses 88 and 90, and carries a nut 94 at each end. The center portion of fastening member 92 has an integral flange 96 which engages the inner surface of boss 90, and an adjustable washer 98 is placed between flange 96 and the inner surface of boss 88. With the disclosed truss arrangement, tension and compression forces in the ribs 80—82—84—86 induced by lateral bending forces acting on the hub, are resisted in shear by the fastening member 92. The second truss, which is not shown in section, comprises ribs 100 and 102 (see Figure 4), fastening member 104 (see Figure 3), and ribs extending from member 104 toward the axle.

Two large-diameter annular bearing assemblies 106 and 108 are supported on the peripheries of the wheel-supporting members 60 and 62, one bearing being carried by each wheel-supporting member. A wheel 110 is rotatably mounted on the bearings 106 and 108, and a tire 112 is carried by the wheel. The tire may be either a hard rubber tire, as shown in Figure 4, or a pneumatic tire, as shown in Figures 1 and 2. The wheel has two annular flanges 114 which engage the races 116 of the respective bearings. The other races 118 of the bearings lie against flanges 120 on the wheel-supporting members.

The landing gear shown in Figures 3 to 13 is designed for use as a main landing gear, and therefore includes a brake assembly. Applicant's internal shock absorber is equally suitable for use either with a braked wheel or with an unbraked wheel. The problem of mounting the shock absorber is made somewhat more difficult by the inclusion of a brake assembly (owing to the reduction in available space), and therefore the landing gear chosen for detailed illustration is one which includes a brake assembly.

The brake used is preferably a disk brake, as shown. A plurality of rotor disks 122 are keyed to the wheel by means of a plurality of circumferentially-spaced axially-extending key members 124 (see Figure 8), which are secured to the axially-extending ribs 126 of the wheel. Each rotor disk may be formed of a plurality of separate segments 128 connected together by links 130. A plurality of lined stator disks 132 are interleaved with the rotor disks and are keyed to the wheel-supporting members by means of the axially-extending tie members 68 (see Figure 7).

Any suitable brake applying means may be used. In the illustrated brake assembly, a plurality of circumferentially-spaced cylindrical pistons 134 are reciprocably mounted in bores 136 provided in wheel-supporting member 62. The bores 136 are connected to a fluid pressure source, and admission of fluid under pressure acts against the pistons 134 to force the brake disks 122 and 132 toward wheel-supporting member 60, which serves as the reaction member, or "backing plate," of the brake. When the fluid pressure is released, the stator disk or plate nearest the pistons 134 is moved to released position by suitable return springs (not shown).

The shock absorber is mounted between the wheel-supporting members 60 and 62 and is located radially inside the brake. It comprises a piston member 138 telescopically associated with a cylinder member 140. The upper end of piston member 138 is pivotally connected to one or more non-rotatable arms 142 which extend upwardly and rearwardly from the axle 50—52 (see Figures 3, 5 and 13). In the illustrated embodiment of the invention there are three aligned axle arms 142, formed integrally with the axle. The arms 142 support a pin 144, which extends through ears 146 provided on the end of member 138. The lower end of cylinder member 140 is pivotally connected to the wheel-supporting members 60 and 62 by suitable means, such as the pivot pin 148, at a point just inside the brake assembly, and below and ahead of the axis of the wheel-supporting members.

The shock absorber may be of the well-known hydro-pneumatic type, in which compressed air in chamber 150 serves as the spring, and energy is dissipated by metering liquid from chamber 152 through orifice 154 into chamber 150 during the compression stroke. A metering pin 156 may be provided in the shock absorber, if necessary.

Although a particular embodiment of my invention has been described, it will be understood by those skilled in the art that the objects of the invention may be attained by the use of constructions different in certain respects from that disclosed without departing from the underlying principles of the invention.

I claim:

1. An aircraft landing gear comprising a downwardly-extending supporting strut, an axle carried by the lower end of the strut, two large-diameter co-axial wheel-supporting members which are secured together and which are pivotally mounted on the axle, two axially-spaced large-diameter bearings, one supported on the periphery of each wheel-supporting member, a wheel rotatably mounted on said bearings, the pivotal axis of wheel-supporting members on the axle being located above and ahead of the axis of the wheel, a disk brake mounted between said wheel-supporting members, said brake comprising one or more disks keyed to the wheel and one or more disks keyed to the wheel-supporting members, axially-movable brake applying means carried by one of the wheel-supporting members, the other wheel-supporting member serving as the reaction element of the brake, one or more non-rotatable arms which extend upwardly and rearwardly from the axle, and a shock absorber mounted between the wheel-supporting members and located radially inside the brake, said shock absorber comprising a piston member and a cylinder member telescopically associated with one another, the end of the piston member remote from the cylinder member being pivotally connected to the axle arm or arms, the end of the cylinder member remote from the piston member being pivotally connected to the wheel-supporting members at a point just inside the brake and below and ahead of the axis of the wheel.

2. An aircraft landing gear comprising a downwardly-extending supporting strut, an axle carried by the lower end of the strut, two co-axial wheel-supporting members which are secured together and which are pivotally mounted on the axle, two axially-spaced bearings, one supported on the periphery of each wheel-supporting member, a wheel rotatably mounted on said bearings, the pivotal axis of the wheel-supporting members on the axle being located above and ahead of the axis of the wheel, a disk brake mounted between said wheel-supporting members, said brake comprising one or more disks keyed to the wheel and one or more disks keyed to the wheel-supporting members, axially-movable brake applying means carried by one of the wheel-supporting members, the other wheel-supporting member serving as the reaction element of the brake, a non-rotatable arm which extends upwardly and rearwardly from the axle, and a shock absorber mounted between the wheel-supporting members and located radially inside the brake, said shock absorber comprising a piston member and a cylinder member telescopically associated with one another, the outer end of one of said shock absorber members being pivotally connected to the axle arm, the outer end of the other shock absorber member being pivotally connected to the wheel-supporting members at a point just inside the brake and below and ahead of the axis of the wheel.

3. An aircraft landing gear comprising a downwardly-extending supporting strut, an axle carried by the lower end of the strut, two co-axial wheel-supporting members which are secured together and which are pivotally mounted on the axle, two axially-spaced bearings, one supported on the periphery of each wheel-supporting member, a wheel rotatably mounted on said bearings, the pivotal axis of the wheel-supporting members on the axle being located above and ahead of the axis of the wheel, a brake mounted between said wheel-supporting members, said brake comprising one or more members rotatable with the wheel and one or more members prevented from rotating by the wheel-supporting members, a non-rotatable arm which extends upwardly and rearwardly from the axle, and a shock absorber mounted between the wheel-supporting members and located radially inside the brake, said shock absorber comprising a piston member and a cylinder member telescopically associated with one another, the outer end of one of said shock absorber members being pivotally connected to the axle arm, the outer end of the other shock absorber member being pivotally connected to the wheel-supporting members at a point just inside the brake and below and ahead of the axis of the wheel.

4. An aircraft landing gear comprising a downwardly-extending supporting strut, an axle carried by the lower end of the strut, two co-axial wheel-supporting members which are secured together and which are pivotally mounted on the axle, a wheel rotatably mounted on the peripheries of said wheel-supporting members, the pivotal axis of the wheel-supporting members on the axle being located above and ahead of the axis of the wheel, a brake mounted between said wheel-supporting members, said brake comprising one or more members rotatable with the wheel and one or more members prevented from rotating by the wheel-supporting members, a non-rotatable arm which extends upwardly and rearwardly from the axle, and a shock absorber mounted between the wheel-supporting members and located radially inside the brake, said shock absorber comprising a piston member and a cylinder member telescopically associated with one another, the other end of one of said shock absorber members being pivotally connected to the axle arm, the outer end of the other shock absorber member being pivotally connected to the wheel-supporting members at a point just inside the brake and below and ahead of the axis of the wheel.

5. An aircraft landing gear comprising a downwardly-extending supporting strut, an axle carried by the lower end of the strut, two co-axial wheel-supporting members which are secured together and which are pivotally mounted on the axle, a wheel rotatably mounted on the peripheries of said wheel-supporting members, the pivotal axis of the wheel-supporting members on the axle being located above and ahead of the axis of the wheel, a non-rotatable arm which extends upwardly and rearwardly from the axle, and a shock absorber mounted between the wheel-supporting members, said shock absorber comprising a piston member and a cylinder member telescopically associated with one another, the outer end of one of said shock absorber members being pivotally connected to the axle arm, the outer end of the other shock absorber member being pivotally connected to the wheel-supporting members at a point below and ahead of the axis of the wheel.

6. An aircraft landing gear comprising a supporting strut, an axle carried by the strut, a wheel-supporting hub pivotally mounted on the axle, a wheel rotatably mounted on the periphery of the hub, the pivotal axis of the hub on the axle being located above and ahead of the axis of the wheel, a non-rotatable arm which extends upwardly and rearwardly from the axle, and a shock absorber mounted inside the hub, said shock absorber comprising two telescopically associated parts, one of which is pivotally connected to the axle arm, and the other of which is pivotally connected to the hub at a point below and ahead of the axis of the wheel.

7. An aircraft landing gear comprising a supporting strut, an axle carried by the strut, a wheel-supporting hub pivotally mounted on the axle, a wheel rotatably mounted on the periphery of the hub, the pivotal axis of the hub on the axle being located above and ahead of the axis of the wheel, a non-rotatable arm which extends upwardly and rearwardly from the axle, and a shock absorber mounted inside the hub, said shock absorber comprising two telescopically associated parts, one of which is pivotally connected to the axle arm, and the other of which is pivotally connected to the hub.

8. An aircraft landing gear comprising a supporting strut, an axle carried by the strut, a wheel-supporting hub pivotally mounted on the axle, a wheel rotatably mounted on the periphery of the hub, the pivotal axis of the hub on the axle being located above and ahead of the wheel, a non-rotatable arm on the axle inside the hub, and a shock absorber mounted inside the hub, said shock absorber comprising two telescopically associated parts, one of which is pivotally connected to said arm, and the other of which is pivotally connected to the hub.

9. An aircraft landing gear comprising a supporting strut, an axle carried by the strut, a wheel-supporting hub pivotally mounted on the axle, a wheel rotatably mounted on the hub, the pivotal axis of the hub on the axle being located above and ahead of the axis of the wheel, an arm on the axle inside the hub, and a shock absorber mounted inside the hub, said shock absorber comprising two telescopically associated parts, one of which is pivotally connected to said arm, and the other of which is pivotally connected to the hub.

10. An aircraft landing gear comprising a wheel-supporting hub, a wheel rotatably mounted on the hub, the hub being pivotally movable about an axis located above and ahead of the axis of the wheel, and a shock absorber mounted inside the hub, said shock absorber comprising two telescopically associated parts, one of which is pivotally connected to a non-rotatable member, and the other of which is pivotally connected to the hub.

11. An aircraft landing gear comprising a supporting strut, an axle carried by the strut, two co-axial wheel-supporting members which are pivotally mounted on the axle and which are spaced apart axially throughout most of their vertical area, a plurality of angularly-spaced axially-extending tie members which have center portions serving as spacers between the two wheel-supporting members and end portions by means of which the wheel-supporting members are secured against movement away from one another, said wheel-supporting members being strengthened against lateral bending forces by at least one truss consisting of aligned internal ribs formed on the two wheel-supporting members and an axially-extending fastening member which extends through the ribs intermediate their ends, a wheel rotatably mounted on the peripheries of said wheel-supporting members, the pivotal axis of the wheel-supporting members on the axle being located above and ahead of the axis of the wheel, a disk brake mounted between said wheel-supporting members, said brake comprising one or more disks rotatable with the wheel and one or more disks keyed on the tie members, and a shock absorber mounted between the wheel-supporting members and located radially inside the brake.

12. An aircraft landing gear comprising a supporting strut, an axle carried by the strut, two co-axial wheel-supporting members which are pivotally mounted on the axle and which are spaced apart axially throughout most of their vertical area, a plurality of angularly-spaced axially-extending tie members which have center portions serving as spacers between the two wheel-supporting members and the end portions by means of which the wheel-supporting members are secured against movement away from one another, said wheel-supporting members being strengthened against lateral bending forces by at least one truss consisting of aligned internal ribs formed on the two wheel-supporting members and an axially-extending fastening member which extends through the ribs intermediate their ends, a wheel rotatably mounted on the peripheries of said wheel-supporting members, the pivotal axis of the wheel-supporting members on the axle being located above and ahead of the axis of the wheel, a brake mounted between said wheel-supporting members, and a shock absorber mounted between the wheel-supporting members and located radially inside the brake.

13. An aircraft landing gear comprising a supporting strut, an axle carried by the strut, two co-axial wheel-supporting members which are pivotally mounted on the axle and which are spaced apart axially throughout most of their vertical area, a plurality of angularly-spaced axially-extending tie members which have center portions serving as spacers between the two wheel-supporting members and end portions by means of which the wheel-supporting members are secured against movement away from one another, said wheel-supporting members being strengthened against lateral bending forces by at least one truss consisting of aligned internal ribs formed on the two wheel-supporting members and an axially-extending fastening member which extends through the ribs intermediate their ends, a wheel rotatably mounted on the peripheries of said wheel-supporting members, the pivotal axis of the wheel-supporting members on the axle being located above and ahead of the axis of the wheel, and a shock absorber mounted between the wheel-supporting members.

14. An aircraft landing gear comprising a supporting strut, an axle carried by the strut, two co-axial wheel-supporting members which are pivotally mounted on the axle, a plurality of angularly-spaced axially-extending tie members by means of which the wheel-supporting members are secured against movement away from one another, said wheel-supporting members being strengthened against lateral bending forces by at least one truss consisting of internal ribs formed on the two wheel-supporting members and an axially-extending fastening member which extends through the ribs intermediate their ends, a wheel rotatably mounted on the peripheries of said wheel-supporting members, the pivotal axis of the wheel-supporting members on the axle being located above and ahead of the axis of the wheel, and a shock absorber mounted between the wheel-supporting members.

15. An aircraft landing gear comprising a supporting strut, an axle carried by the strut, two co-axial wheel-supporting members which are pivotally mounted on the axle, said wheel-supporting members being strengthened against lateral bending forces by at least one truss consisting of internal ribs formed on the two wheel-supporting members and an axially-extending fastening member which extends through the ribs intermediate their ends, a wheel rotatably mounted on the peripheries of said wheel-supporting members, the pivotal axis of the wheel-supporting members on the axle being located above and ahead of the axis of the wheel, and a shock absorber mounted between the wheel-supporting members.

16. An aircraft landing gear comprising a downwardly-extending supporting strut, an axle carried by the lower end of the strut, two co-axial wheel-supporting members which are secured together and which are pivotally mounted on the axle, a wheel rotatably mounted on the peripheries of said wheel-supporting members, the pivotal axis of the wheel-supporting members on the axle being spaced from the axis of the wheel, a brake mounted between said wheel-supporting members, said brake comprising one or more members rotatable with the wheel and one or more members prevented from rotating by the wheel-supporting members, and a shock absorber mounted between the wheel-supporting members and located radially inside the brake, said shock absorber comprising a piston member and a cylinder member telescopically associated with one another, the outer end of one of said shock absorber members being pivotally connected to the axle at a point spaced from the pivotal axis of the wheel-supporting members, the outer end of the other shock absorber member being pivotally connected to the wheel-supporting members at a point just inside the brake.

17. An aircraft landing gear comprising a supporting strut, an axle carried by the strut, a wheel-supporting hub pivotally mounted on the axle, a wheel rotatably mounted on the periphery of the hub, the pivotal axis of the hub on the axle being spaced from the axis of the wheel, and a shock absorber mounted inside the hub, said shock absorber comprising two telescopically associated parts, one of which is pivotally connected to the axle at a point spaced from the pivotal axis of the hub, and the other of which is pivotally connected to the hub.

18. An aircraft landing gear comprising a supporting strut, an axle carried by the strut, a wheel-supporting hub pivotally mounted on the axle, a wheel rotatably mounted on the periphery of the hub, the pivotal axis of the hub on the axle being spaced from the axis of the wheel, and a shock absorber mounted inside the hub, said shock absorber comprising two telescopically associated parts, one of which is pivotally connected to said axle, the other of which is pivotally connected to the hub.

19. An aircraft landing gear comprising a wheel-supporting hub, a wheel rotatably mounted on the hub, the hub being pivotally movable about an axis which is spaced from the axis of the wheel, and a shock absorber mounted inside the hub, said shock absorber comprising two telescopically associated parts, one of which is pivotally connected to a non-rotatable member, and the other of which is pivotally connected to the hub.

FRANKLIN C. ALBRIGHT.

REFERENCES CITED

The following references are of record in the file of this patent:

UNITED STATES PATENTS

| Number | Name | Date |
|---|---|---|
| Re. 12,683 | Sturtevant | Aug. 27, 1907 |
| Re. 22,255 | Dowty | Jan. 26, 1943 |
| 879,287 | Mayo et al. | Feb. 18, 1908 |
| 2,346,667 | Dowty | Apr. 18, 1944 |
| 2,399,846 | Bachman | May 7, 1946 |

FOREIGN PATENTS

| Number | Country | Date |
|---|---|---|
| 521,219 | Great Britain | May 15, 1940 |
| 601,584 | Great Britain | May 10, 1948 |
| 704,249 | France | Feb. 17, 1931 |
| 308,275 | Germany | Oct. 19, 1918 |